United States Patent
Uselton

(10) Patent No.: US 12,044,453 B2
(45) Date of Patent: Jul. 23, 2024

(54) CARBON DIOXIDE COOLING SYSTEM WITH SUBCOOLING

(71) Applicant: Lennox Industries Inc., Richardson, TX (US)

(72) Inventor: Robert B. Uselton, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 109 days.

(21) Appl. No.: 17/450,429

(22) Filed: Oct. 8, 2021

(65) Prior Publication Data

US 2022/0026117 A1  Jan. 27, 2022

Related U.S. Application Data

(63) Continuation of application No. 14/955,359, filed on Dec. 1, 2015, now Pat. No. 11,175,073.

(Continued)

(51) Int. Cl.
*F25B 9/10* (2006.01)
*F25B 7/00* (2006.01)
(Continued)

(52) U.S. Cl.
CPC ............ *F25B 9/10* (2013.01); *F25B 7/00* (2013.01); *F25B 9/008* (2013.01); *F25B 25/005* (2013.01);
(Continued)

(58) Field of Classification Search
CPC .... F25B 7/00; F25B 9/008; F25B 9/10; F25B 25/005; F25B 40/02; F25B 49/02;
(Continued)

(56) References Cited

U.S. PATENT DOCUMENTS

| | | | |
|---|---|---|---|
| 6,321,550 B1 | 11/2001 | Chopko et al. | |
| 2006/0065012 A1* | 3/2006 | Kudo | F04C 28/26 62/470 |

(Continued)

FOREIGN PATENT DOCUMENTS

| | | |
|---|---|---|
| JP | 2005257127 A | 9/2005 |
| WO | 2009103469 A2 | 8/2009 |
| WO | 2014097484 A1 | 6/2014 |

OTHER PUBLICATIONS

Anonymous, "Commercial CO 2 Refrigeration Systems Guide for Subcritical and Transcritical CO 2 Applications," XP055794220, Retrieved from the Internet: URL: https://www.r744.com/files/675_commercial_co2_guide.pdf [retrieved on Apr. 12, 2021], Jan. 1, 2014, pp. 1-44.

(Continued)

*Primary Examiner* — Joseph F Trpisovsky

(57) ABSTRACT

A subcooling controller includes a sensor and a processor. The sensor measures one or more of a temperature external to a first heat exchanger that removes heat from carbon dioxide refrigerant, a temperature of the carbon dioxide refrigerant, and a pressure of the carbon dioxide refrigerant. The processor determines that one or more of the measured temperature external to the first heat exchanger, the temperature of the carbon dioxide refrigerant, and the pressure of the carbon dioxide refrigerant is above a threshold and in response to that determination, activates a subcooling system. The subcooling system includes a condenser, a second heat exchanger, and a compressor. The condenser removes heat from a second refrigerant. The second heat removes heat from the carbon dioxide refrigerant stored in a flash tank. The compressor compresses the second refrigerant from the second heat exchanger and sends the second refrigerant to the condenser.

15 Claims, 5 Drawing Sheets

Related U.S. Application Data

(60) Provisional application No. 62/207,788, filed on Aug. 20, 2015.

(51) Int. Cl.
  *F25B 9/00* (2006.01)
  *F25B 25/00* (2006.01)
  *F25B 40/02* (2006.01)
  *F25B 49/02* (2006.01)
  *F28D 20/02* (2006.01)
  *F25B 41/39* (2021.01)

(52) U.S. Cl.
  CPC .............. *F25B 40/02* (2013.01); *F25B 49/02* (2013.01); *F25B 49/022* (2013.01); *F28D 20/02* (2013.01); *F25B 41/39* (2021.01); *F25B 2500/29* (2013.01); *F25B 2600/2525* (2013.01); *F25B 2700/19* (2013.01); *F25B 2700/21* (2013.01); *F25B 2700/2106* (2013.01)

(58) Field of Classification Search
  CPC ................ F25B 49/022; F25B 2500/29; F25B 2600/2525; F25B 2700/19; F25B 2700/21; F25B 2700/2106
  See application file for complete search history.

(56) References Cited

U.S. PATENT DOCUMENTS

| | | |
|---|---|---|
| 2007/0022777 A1 | 2/2007 | Takegami et al. |
| 2008/0264080 A1 | 10/2008 | Creed et al. |
| 2011/0252820 A1 | 10/2011 | Hockman et al. |
| 2014/0130536 A1 | 5/2014 | Joppolo et al. |
| 2015/0153086 A1* | 6/2015 | Takayama ............... F25B 49/02 62/228.3 |
| 2017/0051950 A1 | 2/2017 | Uselton |

OTHER PUBLICATIONS

European Patent Office, Communication pursuant to Article 94(3) EPC, Application No. 16184234.9, Apr. 16, 2021, 7 pages.

Dieckmann, J. et al., "What's Easiest is Not Always Best" Emerging Technologies; Ashrae Journal, Sep. 2009, 3 pages.

Reulens, W., "Natural Refrigerant CO2;" Leonardo Project Nareco2; Education and Culture Lifelong learning programme—Leonardo Da Vinci, Oct. 2009, 510 pages.

European Patent Office, Extended Search Report for Application No. 16184234.9, Feb. 3, 2017, 7 pages.

* cited by examiner

CARBON DIOXIDE COOLING SYSTEM WITH SUBCOOLING

CROSS REFERENCE TO RELATED APPLICATIONS

This application is a continuation of U.S. patent application Ser. No. 14/955,359 filed Dec. 1, 2015, by Robert B. Uselton, and entitled "Carbon Dioxide Cooling System with Subcooling," which claims benefit of U.S. Provisional Application No. 62/207,788, filed Aug. 20, 2015, by Robert B. Uselton, and entitled "Dual Purpose Refrigeration Accessory for a $CO_2$ Air Conditioner, Refrigeration Unit, or Heat Pump," which are incorporated herein by reference.

TECHNICAL FIELD

This disclosure relates generally to a carbon dioxide ($CO_2$) cooling system that uses subcooling.

BACKGROUND

A cooling system (e.g., air conditioning system and/or refrigeration system) may be used to cool a space by cycling refrigerant through the system. When the system is unable to remove the heat in the refrigerant, pressure in the refrigerant line may increase. The pressure may be decreased by releasing refrigerant out of the system, but the refrigerant would have to be refilled at a later time.

SUMMARY OF THE DISCLOSURE

According to one embodiment, a system includes a first heat exchanger, a flash tank, a first compressor, a condenser, a second heat exchanger, and a second compressor. The first heat exchanger removes heat from carbon dioxide refrigerant. The flash tank stores the carbon dioxide refrigerant from the first heat exchanger. The first compressor compresses the carbon dioxide refrigerant and sends the compressed carbon dioxide refrigerant to the first heat exchanger. The condenser removes heat from a second refrigerant. The second heat exchanger receives the second refrigerant from the condenser. The second heat exchanger further removes heat from the carbon dioxide refrigerant stored in the flash tank. The second compressor compresses the second refrigerant from the heat exchanger. The second compressor sends the second refrigerant to the condenser.

According to another embodiment, a method includes removing, by a first heat exchanger, heat from a carbon dioxide refrigerant. The method also includes storing, by a flash tank, the carbon dioxide refrigerant from the first heat exchanger and compressing, by a first compressor, the carbon dioxide refrigerant. The method further includes sending, by the first compressor, the carbon dioxide refrigerant to the first heat exchanger and removing, by a condenser, heat from a second refrigerant. The method also includes receiving, by a second heat exchanger coupled to the flash tank, the second refrigerant from the condenser and removing, by the second heat exchanger, heat from the carbon dioxide refrigerant stored in the flash tank. The method further includes compressing, by a second compressor, the second refrigerant from the second heat exchanger and sending, by the second compressor, the second refrigerant to the condenser.

According to another embodiment, a system includes a flash tank, a condenser, a heat exchanger, and a compressor. The flash tank stores carbon dioxide refrigerant. The condenser removes heat from a second refrigerant. The heat exchanger is coupled to the flash tank. The heat exchanger receives the second refrigerant from the condenser. The heat exchanger removes heat from the carbon dioxide refrigerant stored in the flash tank. The compressor compresses the second refrigerant from the heat exchanger. The compressor sends the second refrigerant to the condenser.

According to an embodiment, a subcooling controller includes a sensor and a processor. The sensor measures one or more of a temperature external to a first heat exchanger that removes heat from carbon dioxide refrigerant, a temperature of the carbon dioxide refrigerant, and a pressure of the carbon dioxide refrigerant. The first heat exchanger also sends the carbon dioxide refrigerant to a flash tank. The processor determines that one or more of the measured temperature external to the first heat exchanger, the temperature of the carbon dioxide refrigerant, and the pressure of the carbon dioxide refrigerant is above a threshold and in response to that determination, activates a subcooling system. The subcooling system includes a condenser, a second heat exchanger, and a compressor. The condenser removes heat from a second refrigerant. The second heat exchanger receives the second refrigerant from the condenser and removes heat from the carbon dioxide refrigerant stored in the flash tank. The compressor compresses the second refrigerant from the second heat exchanger and sends the second refrigerant to the condenser.

According to another embodiment, a method includes measuring one or more of a temperature external to a first heat exchanger that removes heat from carbon dioxide refrigerant, a temperature of the carbon dioxide refrigerant, and a pressure of the carbon dioxide refrigerant. The first heat exchanger also sends the carbon dioxide refrigerant to a flash tank. The method also includes determining that one or more of the measured temperature external to the first heat exchanger, the temperature of the carbon dioxide refrigerant, and the pressure of the carbon dioxide refrigerant is above a threshold, and in response to that determination, activating a subcooling system. The subcooling system includes a condenser, a second heat exchanger, and a compressor. The condenser removes heat from a second refrigerant. The second heat exchanger receives the second refrigerant from the condenser and removes heat from the carbon dioxide refrigerant stored in the flash tank. The compressor compresses the second refrigerant from the second heat exchanger and sends the second refrigerant to the condenser.

According to another embodiment, a computer-readable non-transitory storage media embodies software that is operable when executed to measure one or more of: a temperature external to a first heat exchanger configured to remove heat from carbon dioxide refrigerant, a temperature of the carbon dioxide refrigerant, and a pressure of the carbon dioxide refrigerant. The first heat exchanger sends the carbon dioxide refrigerant to a flash tank. The software is further operable when executed to determine that one or more of the measured temperature external to the first heat exchanger, the measured temperature of the carbon dioxide refrigerant, and the measured pressure of the carbon dioxide refrigerant is above a threshold and in response to that determination, activate a subcooling system. The subcooling system includes a condenser, a second heat exchanger, and a compressor. The condenser removes heat from a second refrigerant. The second heat exchanger is coupled to the flash tank. The second heat exchanger receives the second refrigerant from the condenser. The second heat exchanger removes heat from the carbon dioxide refrigerant stored in the flash tank. The compressor compresses the second refrigerant from the second heat exchanger. The compressor sends the second refrigerant to the condenser.

Certain embodiments may provide one or more technical advantages. For example, an embodiment provides separate subcooling for $CO_2$ refrigerant. As another example, an embodiment reduces the refill rate on $CO_2$ refrigerant by removing additional heat from the $CO_2$ refrigerant when the cooling system is idle and one or more of the measured temperature external to the first heat exchanger, the measured temperature of the $CO_2$ refrigerant, and the measured pressure of the $CO_2$ refrigerant is above a threshold, and in response to that determination, activating a subcooling system. As yet another example, an embodiment reduces the pressure in a refrigerant line by removing additional heat from $CO_2$ refrigerant. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 4 of the drawings, like numerals being used for like and corresponding parts of the various drawings.

Cooling systems such as air conditioning systems and refrigeration systems may be used to cool a space by cycling refrigerant through the system. For example, an air conditioning system may cycle refrigerant to cool air that is then circulated to cool a space. As another example, a refrigeration system may cycle refrigerant to cool an enclosed space that keeps food or produce cold. In both examples, the refrigerant must remove heat from the air or the space. As a result, the refrigerant absorbs heat and becomes warmer. This heat must then be removed from the refrigerant. As heat is removed from the refrigerant, the refrigerant cools. The cooled refrigerant may then be cycled back through the air conditioning system and/or refrigeration system to again cool the air or the space.

One type of refrigerant that has become increasingly popular is carbon dioxide ($CO_2$) refrigerant. One problem encountered when using $CO_2$ refrigerant is that it may become difficult to remove sufficient heat from the $CO_2$ refrigerant. For example, on warm or hot days it may become more difficult to remove heat from the $CO_2$ refrigerant. As the temperature of the $CO_2$ refrigerant increases, so does the pressure in the $CO_2$ refrigerant line. As a result, the pressure in the $CO_2$ refrigerant line may increase to unsafe levels if sufficient heat is not removed from the $CO_2$ refrigerant. Certain systems include a valve that opens when the pressure in the $CO_2$ refrigerant line reaches particular thresholds. When the valve opens, $CO_2$ refrigerant is released from the system thus reducing the pressure in the $CO_2$ refrigerant line. However, this $CO_2$ refrigerant must then be replaced and/or refilled in the system.

This disclosure contemplates a system that uses both $CO_2$ refrigerant and a subcooling system that removes heat from the $CO_2$ refrigerant. The subcooling system may remove additional heat from the $CO_2$ refrigerant that could not be removed because, for example, it was a warm or hot day. By using the subcooling system, the pressure in the $CO_2$ refrigerant line may be maintained at safe levels without having to release $CO_2$ refrigerant from the system. Therefore, the $CO_2$ refrigerant may not need to be refilled and/or replaced as frequently.

The subcooling system may cycle a coolant such as water that is separate from the $CO_2$ refrigerant. The subcooling system may cycle the coolant to remove heat from the $CO_2$ refrigerant. The subcooling system may include its own condenser, compressor, and heat exchanger. The heat exchanger may be the unit where heat from the $CO_2$ refrigerant is transferred to the coolant. The compressor and the condenser may then operate to remove heat from the coolant.

Figure 1:
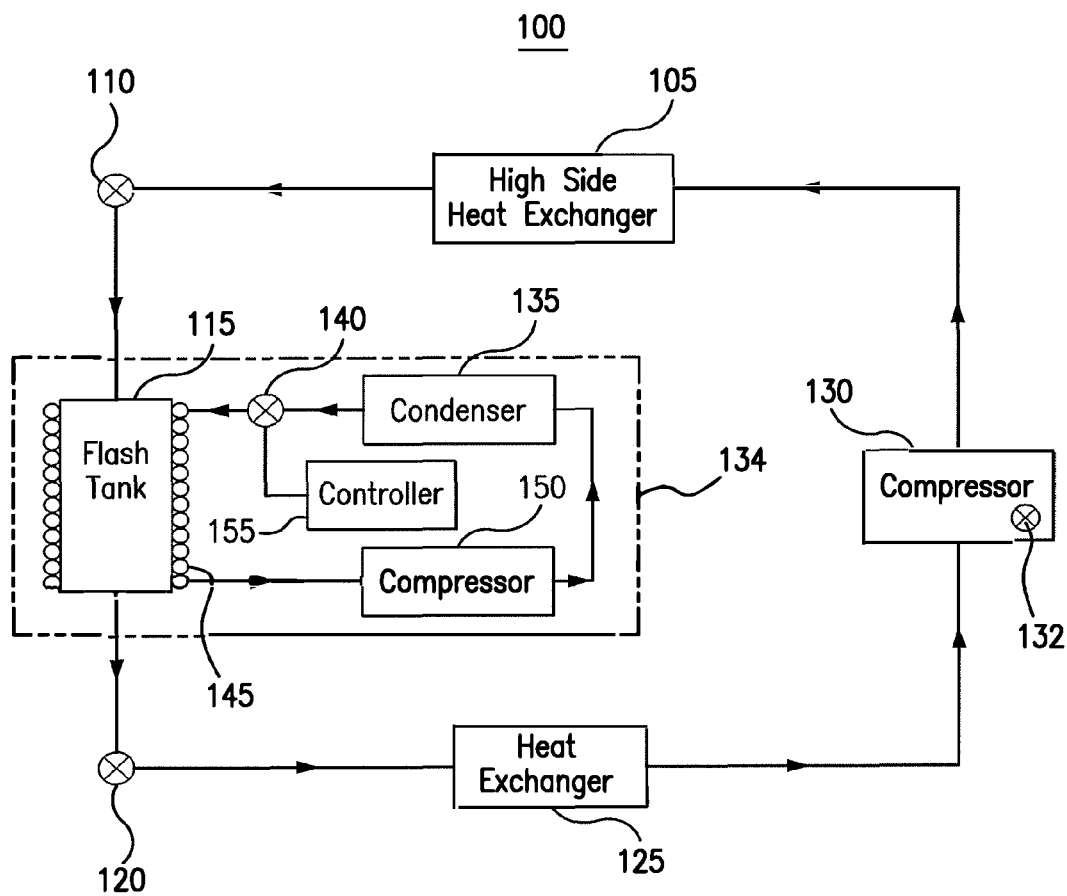
FIG. 1 illustrates an example cooling system with subcooling.
Figure 2A:
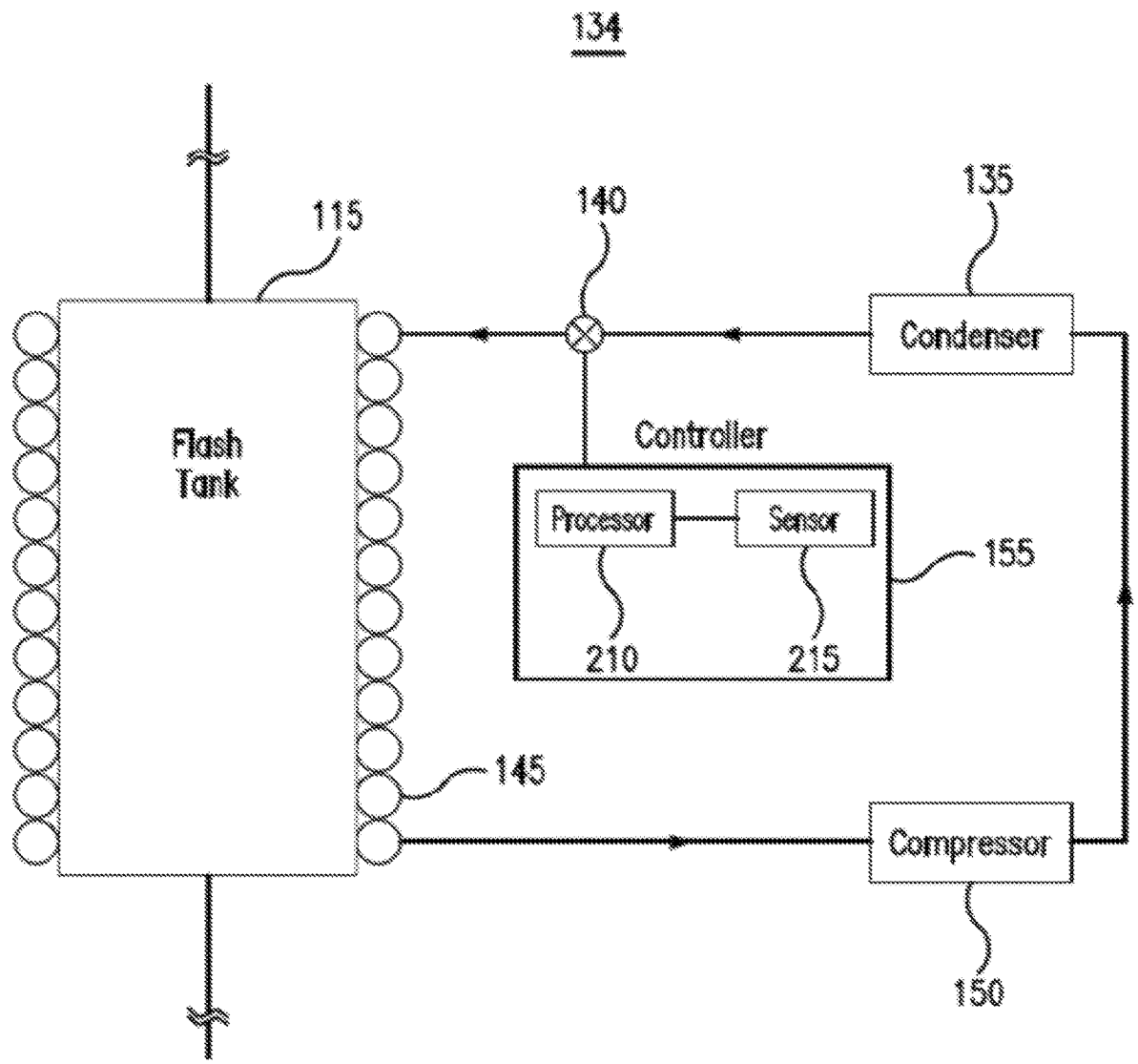
FIG. 2A illustrates an example subcooling system of the cooling system of FIG. 1.
Figure 2B:
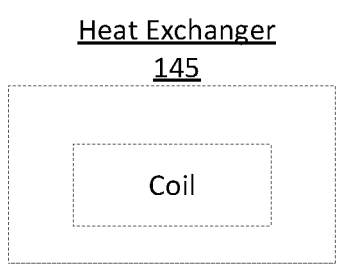
FIGS. 2B-2D illustrate example heat exchangers of the cooling system of FIG. 1.
Figure 2C:
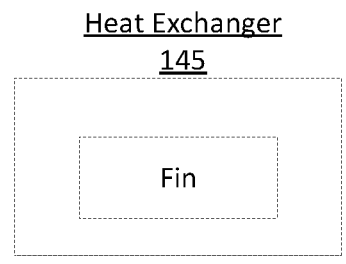
Figure 2D:
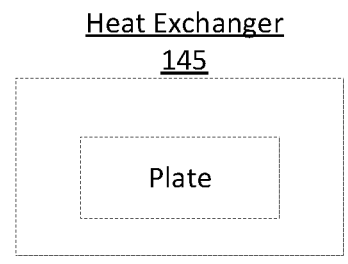
Figure 3:
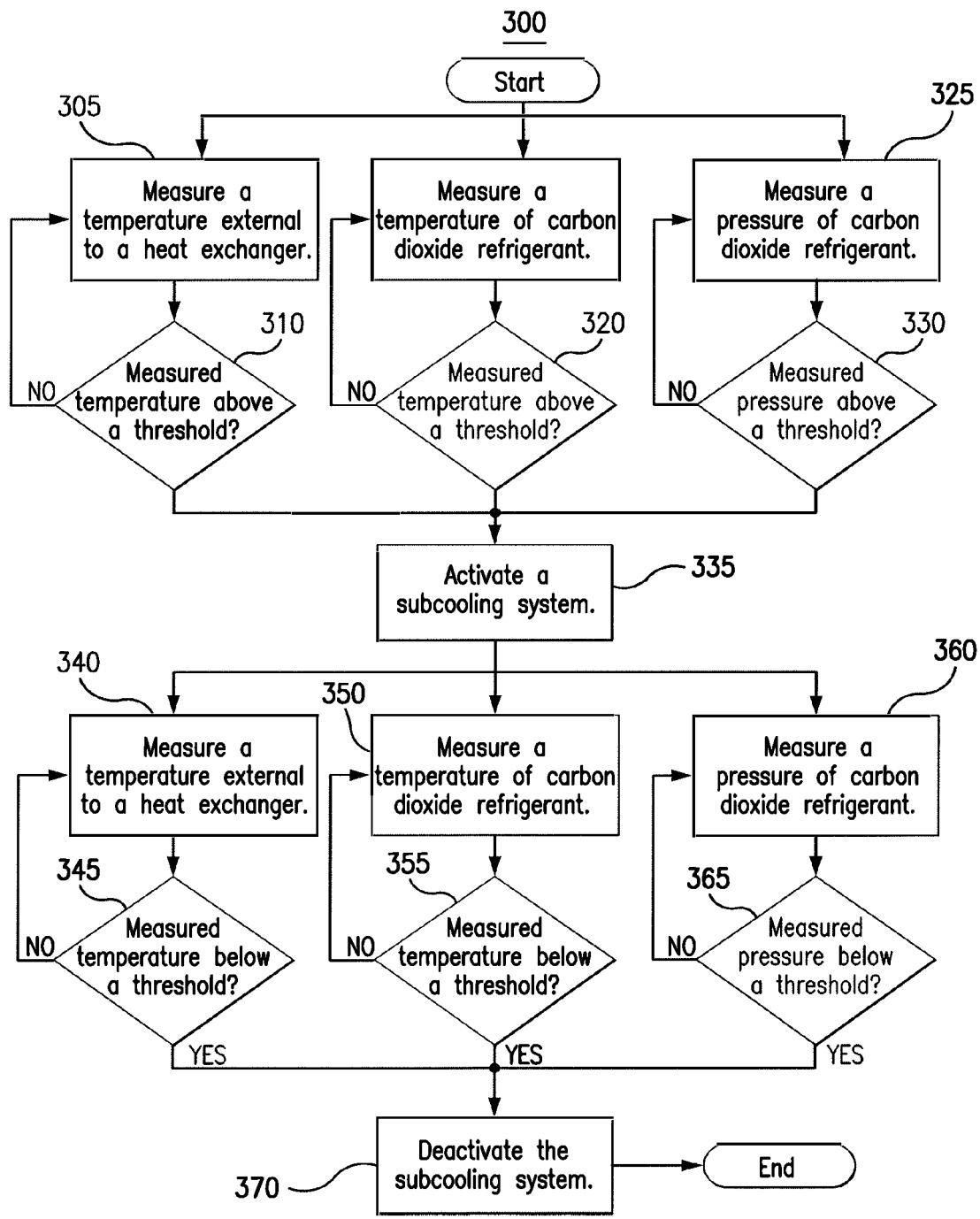
FIG. 3 is a flowchart illustrating an example method for controlling the subcooling system of the cooling system of FIG. 1.
Figure 4:
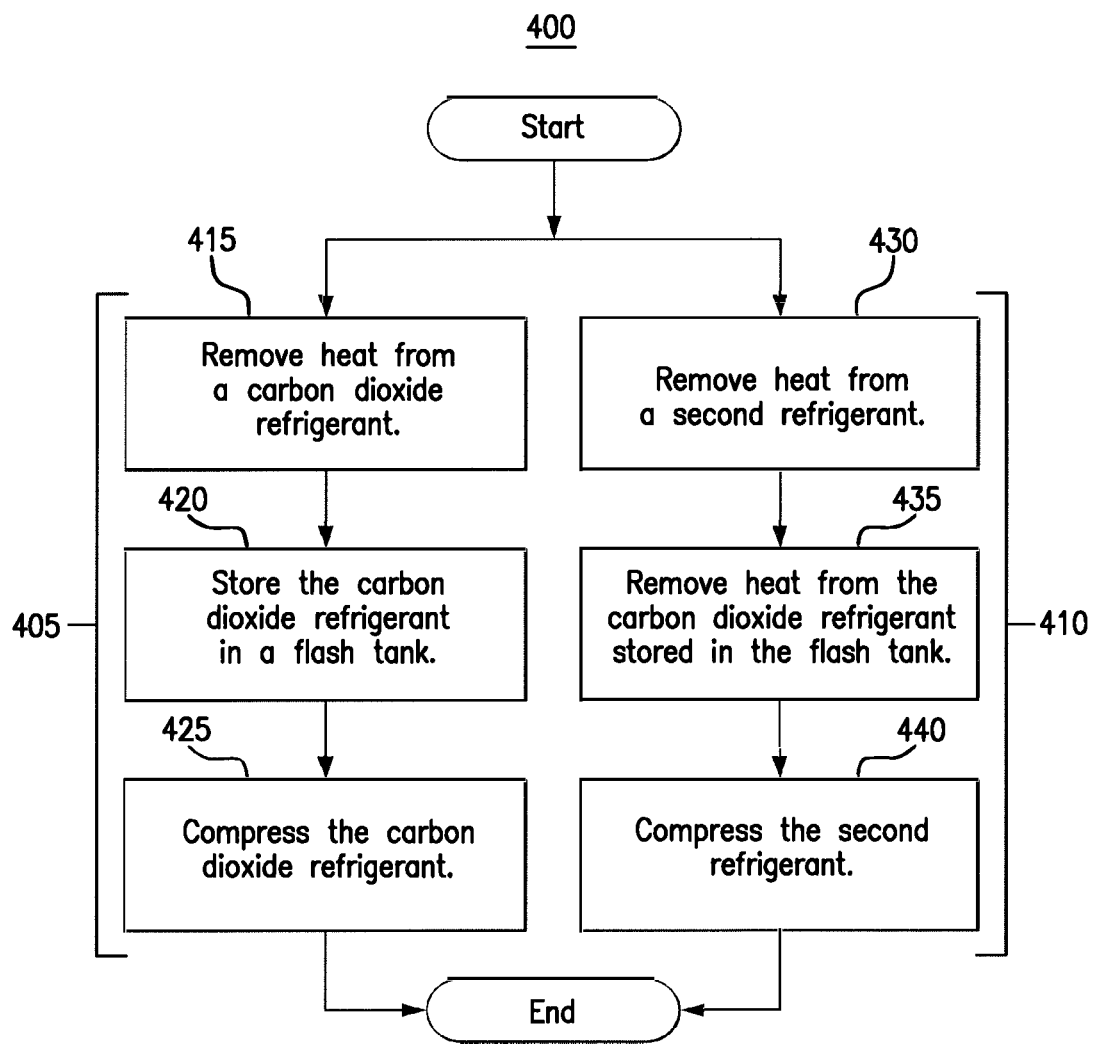
FIG. 4 is a flowchart illustrating an example method for operating the cooling system of FIG. 1.

The system and subcooling system will be described in more detail using FIGS. 1 through 4. FIG. 1 describes the system and the subcooling system generally. FIG. 2 describes the subcooling system in more detail. FIG. 3 describes the operation of the subcooling system. FIG. 4 describes the operation of the cooling system.

FIG. 1 illustrates an example cooling system 100 with subcooling. As illustrated in FIG. 1, system 100 includes a high side heat exchanger 105, an expansion valve 110, a flash tank 115, an expansion valve 120, a heat exchanger 125, a compressor 130, a condenser 135, an expansion valve 140, a heat exchanger 145, and a compressor 150. $CO_2$ refrigerant may be cycled from high side heat exchanger 105 through expansion valve 110 to flash tank 115. The $CO_2$ refrigerant may then be cycled through expansion valve 120 to heat exchanger 125. Then the $CO_2$ refrigerant may be cycled to compressor 130 and then back to high side heat exchanger 105. In certain embodiments, by using system 100, the heat content of the $CO_2$ refrigerant is reduced, thereby increasing the cooling capacity of cooling system 100. The overall efficiency of cooling system 100 is also improved because the cycle used by compressor 150 is more efficient. Pressure in the $CO_2$ may also be reduced.

High side heat exchanger 105 removes heat from a $CO_2$ refrigerant cycling through system 100. When heat is removed from the $CO_2$ refrigerant, the $CO_2$ refrigerant is cooled. This disclosure contemplates high side heat exchanger 105 being operated as a condenser and/or a gas cooler. When operating as a condenser, high side heat exchanger 105 cools the $CO_2$ refrigerant such that the state of the $CO_2$ refrigerant changes from a gas to a liquid. When operating as a gas cooler, high side heat exchanger 105 cools the $CO_2$ refrigerant but the $CO_2$ refrigerant remains a gas.

In certain configurations, high side heat exchanger 105 is positioned such that heat removed from the $CO_2$ refrigerant may be discharged into the air. For example, high side heat exchanger 105 may be positioned on a rooftop so that heat removed from the $CO_2$ refrigerant may be discharged into the air. As another example, high side heat exchanger 105 may be positioned external to a building and/or on the side of a building. When a temperature external to high side heat exchanger 105 is above a certain threshold such as, for example, eighty degrees Fahrenheit, it becomes more difficult for high side heat exchanger 105 to remove heat from the $CO_2$ refrigerant. Thus, the pressure in the $CO_2$ refrigerant line may increase and reach unsafe levels. In these situations, a release valve may open to discharge $CO_2$ refrigerant from system 100. By discharging $CO_2$ refrigerant, the pressure in $CO_2$ refrigerant line is reduced. However, the discharged $CO_2$ refrigerant will need to be replaced and/or refilled at a later time. By using subcooling, these situations may be avoided.

Expansion valves 110 and 120 reduce the pressure and therefore the temperature of the $CO_2$ refrigerant. Expansion valves 110 and 120 reduce pressure from the $CO_2$ refrigerant flowing into the expansion valves 110 and 120. As a result, the temperature of the $CO_2$ refrigerant may drop as pressure is reduced. As a result, warm or hot $CO_2$ refrigerant entering expansion valves 110 and 120 may be cooler when leaving expansion valves 110 and 120. $CO_2$ refrigerant leaving expansion valve 110 is fed into flash tank 115.

Flash tank 115 stores $CO_2$ refrigerant. This disclosure contemplates flash tank 115 storing $CO_2$ refrigerant in any state such as, for example, a liquid state and/or a gaseous state. $CO_2$ refrigerant stored in flash tank 115 may be cooled through subcooling. $CO_2$ refrigerant leaving flash tank 115 is fed to heat exchanger 125 through expansion valve 120. Flash tank 115 is referred to as a receiving vessel in certain embodiments.

Heat exchanger 125 cycles $CO_2$ refrigerant to cool air proximate heat exchanger 125. The cooled air may then be circulated to cool a space. For example, in an air conditioning system, the air may be circulated to cool a room. As another example, in a refrigeration system the air may be circulated to cool a refrigerator shelf. This disclosure contemplates heat exchanger 125 being any appropriate unit that cools a space. For example, heat exchanger 125 may be an evaporator. As another example, heat exchanger 125 may be a coil.

Compressor 130 compresses $CO_2$ refrigerant. Compressing $CO_2$ refrigerant concentrates the heat in the $CO_2$ refrigerant. When the heat is concentrated it may be easier to remove that heat. Compressed $CO_2$ refrigerant leaving compressor 130 is fed back to high side heat exchanger 105.

System 100 includes a subcooling system 134 that removes additional heat from $CO_2$ refrigerant stored in flash tank 115. Subcooling system 134 includes a condenser 135, an expansion valve 140, a heat exchanger 145, and a compressor 150. Subcooling system 134 may cycle a coolant such as, for example, water that is kept separate from the $CO_2$ refrigerant. Heat in the $CO_2$ refrigerant is transferred to the coolant. That heat is then removed by subcooling system 134.

Condenser 135 removes heat from the coolant in subcooling system 134. When heat is removed from the coolant, the coolant may turn from a gaseous state to a liquid state. Condenser 135 may then cycle the coolant through expansion valve 140 to heat exchanger 145. This disclosure contemplates coolant being any appropriate fluid and/or mixture that can absorb heat from the $CO_2$ refrigerant stored in flash tank 115. For example, the coolant may be a refrigerant. As another example, the coolant may be water.

Expansion valve 140 reduces the pressure of the coolant thereby reducing the temperature of the coolant. Expansion valve 140 reduces pressure from the coolant flowing into the expansion valve 140. As a result, the temperature of the coolant may drop as pressure is reduced. As a result, warm or hot coolant entering expansion valve 140 may be cold when leaving expansion valve 140. Coolant leaving expansion valve 140 is fed into heat exchanger 145.

Heat exchanger 145 cycles the coolant to remove heat from the $CO_2$ refrigerant stored in flash tank 115. In certain embodiments, heat exchanger 145 includes coils, as shown in FIGS. 2A and 2B, that coil around flash tank 115. For example, the coils may coil around an interior surface of flash tank 115. As another example, the coils may coil around an exterior surface of flash tank 115. In some embodiments, heat exchanger 145 includes plates and/or fins as shown in FIGS. 2C and 2D. As the coolant travels through heat exchanger 145, heat from $CO_2$ refrigerant stored in flash tank 115 is transferred to coolant cycling through heat exchanger 145. This process warms the coolant. Heat exchanger 145 then feeds the warmed coolant to compressor 150.

In particular embodiments, heat exchanger 145 is coupled to an interior surface of flash tank 115. In this manner, heat exchanger 145 may make direct contact with the $CO_2$ refrigerant stored in flash tank 115. In some embodiments, heat exchanger 145 is coupled to an exterior surface of flash tank 115. In this manner it may be easier to service and/or repair heat exchanger 145.

In certain embodiments, subcooling system 134 includes a controller 155 that directs the operation of subcooling system 134. For example, controller 155 may activate and/or deactivate subcooling system 134 based on certain measured environmental variables, such as an outdoor temperature, a temperature of the $CO_2$ refrigerant, and/or a pressure of the $CO_2$ refrigerant. This disclosure contemplates controller 155 activating and/or deactivating subcooling system 134 based on any appropriate measurement.

Compressor 150 compresses the coolant. Compressing the coolant concentrates the heat within the coolant thereby making it easier to remove that heat. Compressor 150 cycles the coolant back to condenser 135. In particular embodiments, compressor 130 includes a pressure valve 132 that opens when an internal pressure of compressor 130 exceeds a threshold. For example, valve 132 may open if the internal pressure of compressor 130 exceeds one thousand pounds per square inch. The internal pressure of compressor 130 may be the pressure in the $CO_2$ refrigerant line. If the pressure becomes too high, then it may become unsafe to operate system 100. Opening pressure valve 132 releases $CO_2$ refrigerant thereby decreasing the pressure in the $CO_2$ refrigerant line and the internal pressure of compressor 130. However, the released $CO_2$ refrigerant will need to be replaced and/or refilled at a later time.

In certain embodiments, by using system 100 including subcooling system 134, separate subcooling for $CO_2$ refrigerant is provided. In some embodiments, by using system 100 including subcooling system 134, the refill rate on $CO_2$ refrigerant is reduced because the system has a cold temperature zone to attract and hold liquid $CO_2$ refrigerant, thus keeping the pressure in the system at a controlled, lower pressure.

Modifications, additions, or omissions may be made to the present disclosure without departing from the scope of the invention. For example, the components of system 100 may be integrated or separated.

FIG. 2 illustrates an example subcooling system 134 of the cooling system 100 of FIG. 1. As illustrated in FIG. 2, subcooling system 134 includes condenser 135, expansion valve 140, heat exchanger 145, compressor 150, and controller 155. Although certain elements of system 100 have not been illustrated in FIG. 2, their omission from FIG. 2 should not be construed or interpreted as their omission from system 100. In certain embodiments, by using subcooling system 134, additional heat may be removed from $CO_2$ refrigerant stored in flash tank 115.

Controller 155 may control the operation of subcooling system 134. For example, controller 155 may activate and deactivate subcooling system 134. Controller 155 may activate subcooling system 134 by opening expansion valve 140. Controller 155 may deactivate subcooling system 134 by closing expansion valve 140. In certain embodiments, controller 155 further controls subcooling system 134 by controlling when electric power is supplied to compressor 150.

Controller 155 includes a processor 210 and a sensor 215. Processor 210 interprets information sent by sensor 215 and controls the operation of subcooling system 134. Sensor 215 takes measurements associated with system 100 such as pressure and temperature. This disclosure contemplates processor 210 and sensor 215 being configured to perform any of the operations of controller 155. Processor 210 executes software to perform any of the functions of controller 155 described herein. The software may be stored on a computer-readable non-transitory storage media, such as for example, a hard drive, a disk, a CD, and a flash drive. The media may include random access memory (RAM), read only memory (ROM), magnetic storage devices, optical storage devices, or any other suitable information storage device or a combination of these devices. The software represents any suitable set of instructions, logic, or code embodied in a computer-readable storage medium. Processor 210 controls the operation and administration of subcooling system 134 by processing information received from other components such as sensor 215. Processor 210 includes any hardware and/or software that operates to control and process information. Processor 210 may be a programmable logic device, a microcontroller, a microprocessor, any suitable processing device, or any suitable combination of the preceding.

Sensor 215 measures certain factors that affect the operation of system 100. For example, sensor 215 may be a temperature sensor that senses the temperature of $CO_2$ refrigerant in system 100. As another example, sensor 215 may be a temperature sensor that measures a temperature external to high side heat exchanger 105, such as an outdoor temperature. As yet another example, sensor 215 may be a pressure sensor that measures a pressure in the $CO_2$ refrigerant line. Sensor 215 may communicate its measurements to processor 210, and processor 210 may activate and/or deactivate subcooling system 134 based on that information. Sensor 215 may measure one or more of any of these factors that affect the operation of system 100. This disclosure also contemplates sensor 215 measuring any appropriate factor, such as for example, air speed and/or radiant energy.

For example, sensor 215 may measure a temperature external to high side heat exchanger 105 such as, for example, an outdoor temperature. If high side heat exchanger 105 is outdoors such as, for example, on a rooftop, sensor 215 may measure the outdoor temperature above the roof. Sensor 215 may then communicate that measured temperature to processor 210, and processor 210 may control subcooling system 134 based on that measured temperature. For example, if sensor 215 measures the outdoor temperature to be above eighty degrees Fahrenheit, processor 210 may activate subcooling system 134 by opening expansion valve 140 and by applying electric power to compressor 150. If sensor 215 measures that the outdoor temperature is below eighty degrees Fahrenheit, processor 210 may deactivate subcooling system 134 by closing expansion valve 140 and by removing power to compressor 150.

As another example, sensor 215 may be a temperature sensor that measures a temperature of the $CO_2$ refrigerant in system 100. Sensor 215 may then communicate that measured temperature to processor 210, and processor 210 may activate and/or deactivate subcooling system 134 based on that measured temperature. For example, if sensor 215 measures the temperature of the $CO_2$ refrigerant to be higher than a particular threshold, then an internal pressure of system 100 may be too high because the $CO_2$ refrigerant is too hot. Based on that measurement, processor 210 may activate subcooling system 134 to remove additional heat from the $CO_2$ refrigerant. If sensor 215 measures that the temperature of the $CO_2$ refrigerant is below the threshold, then processor 210 may deactivate subcooling system 134.

As yet another example, sensor 215 may be a pressure sensor that measures a pressure in the $CO_2$ refrigerant line. If the pressure in the $CO_2$ refrigerant line is above a particular threshold such as, for example, one thousand pounds per square inch, then processor 210 may activate subcooling system 134 to remove heat from the $CO_2$ refrigerant. By removing the heat, the pressure in the $CO_2$ refrigerant line will be reduced. If the pressure in the refrigerant line is below the threshold such as, for example, one thousand pounds per square inch, then processor 210 may deactivate subcooling system 134.

In certain embodiments, removing additional heat from the $CO_2$ refrigerant reduces the pressure in the $CO_2$ refrigerant line. Reducing the pressure in the $CO_2$ refrigerant line may avoid the $CO_2$ refrigerant needing to be discharged from system 100. As a result, the frequency at which the $CO_2$ refrigerant needs to be refilled and/or replaced is reduced.

In particular embodiments, an auxiliary subcooling mechanism may be provided in system 100. For example, ice or another thermal storage material may be coupled to heat exchanger 145 and/or flash tank 115. The ice may absorb heat from the $CO_2$ refrigerant stored in flash tank 115 and/or the coolant cycling through subcooling system 134. In this manner, the $CO_2$ refrigerant may be cooled for a period of time even if subcooling system 134 does not have power or malfunctions.

In particular embodiments, system 100 includes an internal combustion engine generator that powers subcooling system 134. For example, the internal combustion engine generator may power condenser 135, heat exchanger 145, compressor 150, and controller 155. In this manner, the powering mechanism for subcooling system 134 is separate from the powering mechanism for the rest of system 100.

FIG. 3 is a flowchart illustrating an example method 300 for controlling subcooling system 134 of the cooling system 100 of FIG. 1. In particular embodiments, controller 155 performs method 300. By performing method 300, additional heat may be removed from the $CO_2$ refrigerant stored in flash tank 115. In particular embodiments, removing additional heat from the $CO_2$ refrigerant reduces the temperature and/or the pressure of the $CO_2$ refrigerant. As a result, the $CO_2$ refrigerant may not need to be released from system 100, thus reducing the number of times the $CO_2$ refrigerant needs to be refilled and/or replaced.

Controller 155 begins by measuring a factor that affects the operation of system 100. In particular embodiments, sensor 215 takes these measurements. Controller 155 may measure a temperature external to a heat exchanger in step 305. The external temperature may be an outdoor temperature. When the outdoor temperature is too hot, it may become difficult for the heat exchanger to remove heat from $CO_2$ refrigerant. In step 310, controller 155 determines whether the measured temperature in step 305 is above a particular threshold such as, for example, eighty degrees Fahrenheit. If the temperature is not above the threshold, then controller 155 returns to step 305.

In step 315, controller 155 measures a temperature of $CO_2$ refrigerant in system 100. If the $CO_2$ refrigerant is too hot then system 100 may be encountering difficulties removing heat from the $CO_2$ refrigerant. In step 320, controller 155 determines whether the measured temperature is above the threshold. If the measured temperature is not above the threshold, then controller 155 returns to step 315.

In step 325, controller 155 measures a pressure of $CO_2$ refrigerant in system 100. For example, controller 155 may measure a pressure of the $CO_2$ refrigerant line in system 100. If the pressure is too high, then system 100 may be encountering difficulties removing heat from the carbon dioxide refrigerant. In step 330, controller 155 determines whether the pressure measured in step 325 is above a threshold such as, for example, one thousand pounds per square inch. If the measured pressure is not above the threshold, then controller 155 returns to step 325.

This disclosure contemplates controller 155 measuring one or more of the temperature external to the heat exchanger, the temperature of the carbon dioxide refrigerant and/or pressure of the carbon dioxide refrigerant. Any of these measurements may be used individually or in combination to control the operation of system 100

If one or more of the temperature measured in step 305, the temperature measured in step 315, and/or the pressure measured in step 325 is above their respective thresholds, then controller 155 proceeds to step 335 to activate a subcooling system. By activating the subcooling system, additional heat may be removed from the $CO_2$ refrigerant. As a result, the temperature of the $CO_2$ refrigerant and the pressure in the $CO_2$ refrigerant line may be reduced.

After the subcooling system is activated, controller 155 will monitor conditions to determine when the subcooling system should be deactivated. In step 340, controller 155 measures a temperature external to the heat exchanger. In step 345, controller 155 determines whether the measured temperature is below a threshold. If not, controller 155 returns to step 340. In step 350, controller 155 measures a temperature of $CO_2$ refrigerant. In step 355, controller 155 determines if the measured temperature is below a threshold. If not, controller 155 returns to step 350. In step 360, controller 155 measures a pressure of $CO_2$ refrigerant. In step 365, controller 155 determines if the measured pressure is below a threshold. If not, controller 155 returns to step 360.

If one or more of the temperature measured in step 340, the temperature measured in step 350, and/or the pressure measured in step 360 are below their respective thresholds, then controller 155 proceeds to step 370 to deactivate the subcooling system.

Modifications, additions, or omissions may be made to method 300 depicted in FIG. 3. Method 300 may include more, fewer, or other steps. For example, steps may be performed in parallel or in any suitable order. While discussed as controller 155 performing the steps, any suitable component of system 100, such as processor 210 and sensor 215 for example, may perform one or more steps of the method.

FIG. 4 is a flowchart illustrating an example method 400 for operating the cooling system 100 of FIG. 1. Method 400 includes two branches 405 and 410. In particular embodiments, components of cooling system 100 perform branch 405 and components of subcooling system 134 perform branch 410. In step 415, high side heat exchanger 105 removes heat from a $CO_2$ refrigerant. In step 420, flash tank 115 stores the $CO_2$ refrigerant. In step 425, compressor 130 compresses the $CO_2$ refrigerant. In step 430, condenser 135 removes heat from a second refrigerant. In step 435, heat exchanger 145 removes heat from the $CO_2$ refrigerant stored in flash tank 115. In step 440, compressor 150 compresses the second refrigerant.

Modifications, additions, or omissions may be made to method 400 depicted in FIG. 4. Method 400 may include more, fewer, or other steps. For example, steps may be performed in parallel or in any suitable order. While discussed as various components of cooling system 100 and subcooling system 134 performing the steps, any suitable component or combination of components of system 100 may perform one or more steps of the method.

Modifications, additions, or omissions may be made to the present disclosure without departing from the scope of the invention. For example, the components of system 100 may be integrated or separated. As another example, controller 155 and expansion valve 140 may be integrated.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A subcooling controller comprising:
 a sensor configured to measure:
   a temperature external to a first heat exchanger configured to remove heat from a carbon dioxide refrigerant, the first heat exchanger further configured to send the carbon dioxide refrigerant through an expansion valve, wherein the carbon dioxide refrigerant leaving the expansion valve is fed to a flash tank;
 and
 a processor configured to:
   determine that the measured temperature external to the first heat exchanger is above a threshold;
   in response to the determination that the measured temperature external to the first heat exchanger is above the threshold, activate a subcooling system, the subcooling system comprising:
     a condenser configured to remove heat from a second refrigerant;
     a second heat exchanger coupled to an exterior surface of the flash tank, the second heat exchanger configured to receive the second refrigerant from the condenser, the second heat exchanger further configured to remove heat from the carbon dioxide refrigerant stored in the flash tank; and
     a compressor configured to compress the second refrigerant from the second heat exchanger, the compressor configured to send the second refrigerant to the condenser.

2. The subcooling controller of claim 1, wherein the second heat exchanger comprises one or more of a fin and a plate.

3. The subcooling controller of claim 1, wherein the first heat exchanger is further configured to receive the carbon dioxide refrigerant from a second compressor comprising a pressure valve configured to open when an internal pressure exceeds a threshold.

4. The subcooling controller of claim 1, wherein an internal combustion engine generator powers at least one of the compressor and the subcooling controller.

5. The subcooling controller of claim 1, wherein the subcooling system further comprises a second expansion valve configured to reduce pressure of the second refrigerant through the second expansion valve to the second heat exchanger, the subcooling controller configured to activate the subcooling system by alternately opening and closing the second expansion valve.

6. A method comprising:
   measuring:
      a temperature external to a first heat exchanger configured to remove heat from a carbon dioxide refrigerant, the first heat exchanger further configured to send the carbon dioxide refrigerant through an expansion valve, wherein the carbon dioxide leaving the expansion valve is fed to a flash tank;
      and
   determining that the measured temperature external to the first heat exchanger, is above a threshold;
   in response to the determination that the measured temperature external to the first heat exchanger, is above the threshold, activating a subcooling system, the subcooling system comprising:
      a condenser configured to condense a second refrigerant;
      a second heat exchanger coupled to an exterior surface of the flash tank, the second heat exchanger configured to receive the second refrigerant from the condenser, the second heat exchanger further configured to remove heat from the carbon dioxide refrigerant stored in the flash tank; and
      a compressor configured to compress the second refrigerant from the second heat exchanger, the compressor configured to send the second refrigerant to the condenser.

7. The method of claim 6, wherein the second heat exchanger comprises one or more of a fin and a plate.

8. The method of claim 6, wherein the first heat exchanger is further configured to receive the carbon dioxide refrigerant from a second compressor comprising a pressure valve configured to open when an internal pressure exceeds a threshold.

9. The method of claim 6, wherein an internal combustion engine generator powers at least one of the compressor and the subcooling controller.

10. The method of claim 6, wherein the subcooling system further comprises a second expansion valve configured to reduce pressure of the second refrigerant through the second expansion valve to the second heat exchanger, the subcooling controller configured to activate the subcooling system by alternately opening and closing the second expansion valve.

11. One or more computer-readable non-transitory storage media embodying software that is operable when executed to:
   measure of:
      a temperature external to a first heat exchanger configured to remove heat from a carbon dioxide refrigerant, the first heat exchanger further configured to send the carbon dioxide refrigerant through an expansion valve, wherein the carbon dioxide refrigerant leaving the expansion valve is fed to a flash tank;
      and
   determine that the measured temperature external to the first heat exchanger, is above a threshold;
   in response to the determination that one or more of the measured temperature external to the first heat exchanger, is above the threshold, activate a subcooling system, the subcooling system comprising:
      a condenser configured to remove heat from a second refrigerant;
      a second heat exchanger coupled to an exterior surface of the flash tank, the second heat exchanger configured to receive the second refrigerant from the condenser, the second heat exchanger further configured to remove heat from the carbon dioxide refrigerant stored in the flash tank; and
      a compressor configured to compress the second refrigerant from the second heat exchanger, the compressor configured to send the second refrigerant to the condenser.

12. The media of claim 11 wherein the second heat exchanger comprises one or more of a fin and a plate.

13. The media of claim 11, wherein an internal combustion engine generator powers at least one of the compressor and the subcooling controller.

14. The media of claim 11, wherein the first heat exchanger is further configured to receive the carbon dioxide refrigerant from a second compressor comprising a pressure valve configured to open when an internal pressure exceeds a threshold.

15. The media of claim 11,
   wherein the expansion valve is a first expansion valve, and
   wherein the subcooling system further comprises a second expansion valve configured to reduce pressure of the second refrigerant through the second expansion valve to the second heat exchanger, the subcooling controller configured to activate the subcooling system by alternately opening and closing the second expansion valve.

* * * * *